US008612962B2

(12) United States Patent
Riedmann et al.

(10) Patent No.: US 8,612,962 B2
(45) Date of Patent: Dec. 17, 2013

(54) METHOD FOR PROGRAMMING A MEMORY-PROGRAMMABLE CONTROLLER WITH RESISTANT STORAGE OF DATA IN MEMORY

(75) Inventors: Stefan Riedmann, Gemuenden (DE); Wolfgang Paul, Lohr am Main (DE); Stephan Schultze, Lohr-Wombach (DE)

(73) Assignee: Robert Bosch GmbH, Stuttgart (DE)

( * ) Notice: Subject to any disclaimer, the term of this patent is extended or adjusted under 35 U.S.C. 154(b) by 522 days.

(21) Appl. No.: 12/840,765

(22) Filed: Jul. 21, 2010

(65) Prior Publication Data

US 2011/0022785 A1 Jan. 27, 2011

(30) Foreign Application Priority Data

Jul. 21, 2009 (DE) .......................... 10 2009 033 967

(51) Int. Cl.
*G06F 9/44* (2006.01)

(52) U.S. Cl.
USPC ........... 717/168; 717/110; 717/117; 717/120; 717/121; 700/23; 700/86; 700/87; 711/103; 711/E12.001; 711/E12.008

(58) Field of Classification Search
None
See application file for complete search history.

(56) References Cited

U.S. PATENT DOCUMENTS

| 5,276,811 | A  | * | 1/1994  | Zifferer et al. ................... 703/25 |
| 7,080,137 | B2 | * | 7/2006  | Brault ........................... 709/224 |
| 7,098,771 | B2 | * | 8/2006  | Lefebvre et al. ......... 340/286.02 |
| 7,574,417 | B1 | * | 8/2009  | McGreevy et al. ............. 706/59 |
| 7,749,194 | B2 | * | 7/2010  | Edwards et al. .............. 604/131 |
| 8,255,875 | B2 | * | 8/2012  | Chouinard et al. ........... 717/124 |
| 2002/0161827 | A1 | * | 10/2002 | Brault ........................... 709/203 |
| 2004/0015244 | A1 | * | 1/2004  | Fujinami et al. ................ 700/18 |
| 2004/0193287 | A1 | * | 9/2004  | Lefebvre et al. .................. 700/1 |
| 2004/0261056 | A1 | * | 12/2004 | Goeddemeier et al. ....... 717/108 |
| 2007/0073426 | A1 | * | 3/2007  | Chand ............................ 700/87 |
| 2008/0306436 | A1 | * | 12/2008 | Edwards et al. ................ 604/67 |
| 2010/0082133 | A1 | * | 4/2010  | Chouinard et al. ............ 700/86 |
| 2010/0083213 | A1 | * | 4/2010  | Chouinard et al. ........... 717/104 |
| 2010/0083229 | A1 | * | 4/2010  | Chouinard et al. ........... 717/120 |
| 2010/0083232 | A1 | * | 4/2010  | Chouinard et al. ........... 717/124 |

FOREIGN PATENT DOCUMENTS

JP 2008269449 A * 11/2008
JP 2010049484 A * 3/2010

* cited by examiner

*Primary Examiner* — Steven Snyder
(74) *Attorney, Agent, or Firm* — Maginot, Moore & Beck

(57) ABSTRACT

The invention relates to a method for programming and/or diagnosis of a memory-programmable controller, having at least one memory-programmable function component. For programming, a predetermined programming system is used. In the context of this programming system variables are predetermined, and information exchange sequences are used for the programming. Results of the programming are output during at least one programming mode via an output device, and input information is at least in part stored permanently in memory.

14 Claims, 4 Drawing Sheets

```
24
1    Program PlcProg
2    VAR
3        fbPICtrl_1: IL_PIType01;
4
5        fbPICtrl_2: IL_PIType01 :=
6        (
7            Enable:= FALSE,
8            Pause:= FALSE,
9            Preset:= FALSE,
10           Setpoint:= 0.0,
11           Feedback:= 0.0,
12           PresetValue:= 0.0,
13           HighLimit:= 10.0,
14           LowLimit:= -10.0,
15           PControl:= 1.0,
16           IControl:= T#100MS,
17           FeedbackTControl:= T#20MS
18       );
19
20   END_VAR
```

```
26
1    Program PlcProg
2    VAR
3        fbPICtrl_1: IL_PIType01;
4
5        fbPICtrl_2: IL_PIType01 :=
6        (
7            Enable:= FALSE,
8            Pause:= FALSE,
9            Preset:= FALSE,
10           Setpoint:= 15.0,
11           Feedback:= 0.0,
12           PresetValue:= 30.0,
13           HighLimit:= 10.0,
14           LowLimit:= -10.0,
15           PControl:= 5.3,
16           IControl:= T#250MS,
17           FeedbackTControl:= T#50MS
18       );
19
20   END_VAR
```

```
Program PlcProg
VAR
    fbPICtrl_1: IL_PIType01;

fbPICtrl_2: IL_PIType01 :=
    (
        Enable:= FALSE,
        Pause:= FALSE,
        Preset:= FALSE,
        Setpoint:= 15.0,
        Feedback:= 0.0,
        PresetValue:= 30.0,
        HighLimit:= 10.0,
        LowLimit:= -10.0,
        PControl:= 5.3,
        IControl:= T#250MS,
        FeedbackTControl:= T#50MS
    );
END_VAR
```

```
Program PlcProg
VAR
    fbPICtrl_1: IL_PIType01;

fbPICtrl_2: IL_PIType01 :=
    (
        Enable:= FALSE,
        Pause:= FALSE,
        Preset:= FALSE,
        Setpoint:= 0.0,
        Feedback:= 0.0,
        PresetValue:= 0.0,
        HighLimit:= 10.0,
        LowLimit:= -10.0,
        PControl:= 1.0,
        IControl:= T#100MS,
        FeedbackTControl:= T#20MS
    );
END_VAR
```

FIG. 5

METHOD FOR PROGRAMMING A MEMORY-PROGRAMMABLE CONTROLLER WITH RESISTANT STORAGE OF DATA IN MEMORY

CROSS-REFERENCE TO RELATED APPLICATION

This application is based on German Patent Application 10 2009 033 967.1 filed Jul. 21, 2009.

BACKGROUND OF THE INVENTION

1. Field of the Invention

The present invention relates to a method for programming and diagnosis of a memory-programmable controller (SPS).

2. Description of the Prior Art

Such controllers are used in automation, in order to control method sequences in machines and systems or to trigger individual drives of these systems. More precisely, the present invention can be employed in the context of engineering of automation devices or combinations that include a memory-programmable controller. In the programming of such controllers, it is known to make a certain error search mode (debugging mode) available, in which inputs and outputs are displayed as numerical values by means of a so-called online status display, but without reference to the logical function of the function components. Thus only a display of numerical values is possible, but not a processed display of the functionality or an overview.

For programming such SPS controllers, in the prior art SPS programming systems are used. Often, the programming of memory-programmable controllers is done by means of programming languages in accordance with IEC 61131-3 (for instance by means of ST: Structured Text, FUP: Function Plan, KOP: Contact Plan, etc.). Thus in the prior art as well, SPS programming is very flexible, and thus essentially arbitrary sequences can also be controlled.

SPS programming systems known from the prior art typically have a user surface with the aid of which SPS programs and SPS function components can be set up in various languages or dialects. It is usual to instantiate these function components, which means that each function component when it is used like a variable must be declared and defined individually and separately.

As noted above, for diagnosis of the set-up programs and function components, the debugging mode is available, with the aid of which, in the context of the programming surface, the status of SPS variables can be visually displayed. This is done with the aid of a status display, which is variable in its appearance, depending on the programming language used.

It is also conventional for the SPS programs and function components to be broken down into a declaration part and an implementation part; in the declaration part, the SPS variables and function component instances are instantiated (data), and in the implementation part, the functionality is written as dedicated code (logic). The term "instantiation" is understood to mean defining or producing the various variables and the instances.

In the context of the debugging mode mentioned, within the programming system, values of SPS variables can be read, altered, and forced (compelled). The term "forcing" is understood to mean the permanent setting of a variable at a predeterminable value. Moreover, the aforementioned status display, in the context of a function component, also makes it possible to represent internal function component values which cannot be called up outside the function component. For instance, internal states of a function component can be displayed.

From German Patent Application DE 10 2007 062 453.2, as yet unpublished, a method is known for programming and/or diagnosis of a memory-programmable controller. In it, outcomes during a programming mode are output via a display device, and the information exchange sequences used for the programming are available as predefined information exchange sequences of a memory-programmable function component. Thus DE 10 2007 062 453.2 describes a capability of displaying a dialogue-based support in SPS programming as well as optimization of program parameters. The subject of DE 10 2007 062 453.2, filed in the German Patent and Trademark Office by the present Applicant on Dec. 22, 2007, is hereby incorporated in its entirety by reference in the subject of the present patent application as well.

In the case of DE 10 2007 062 453.2, however, the problem sometimes occurs that programming in the offline mode, for instance, is not possible and the SPS variables cannot be changed. It is therefore the object of the present invention to improve the programmability for memory-programmable controllers.

ADVANTAGES AND SUMMARY OF THE INVENTION

In a method according to the invention for programming and/or diagnosis of a memory-programmable controller (SPS), having at least one memory-programmable function component, for programming, a predetermined programming system is used, and in the context of this programming system variables are predetermined, and information exchange sequences are used for the programming. According to the invention, outcomes or results of the programming are output during at least one programming mode via an output device, and input information is at least in part stored permanently in memory.

In the case of DE 10 2007 062 453.2, no persistent storage of data was contemplated. It is thus proposed that certain changes be designed to be persistent, or in other words permanent, especially if graphical or textual support is used in programming SPS programs or optimizing program parameters, that is, especially inputs and/or outputs of SPS function components. The present invention serves in particular to engineer automation devices or automation combinations that contain a memory-programmable controller. Preferred fields of application are those in tool technology, packaging, production technology, and the like.

By the procedure of the invention, persistence of changes made is attained even after a reset or rebooting. In contrast to the prior art, changes introduced though function component dialogs are thus not lost after shutoff and need not be entered manually in the SPS program by an SPS programmer, either.

The term "persistence" is understood to mean permanent storage in memory of a status of an SPS instance, in particular including the changes that have been made.

In an advantageous method, the aforementioned information exchange sequences are assigned to the function component and are available as predefined information exchange sequences of this memory-programmable function component.

In a further advantageous method, the outcomes of the programming are changes made by inputs or outputs of the function component, and in particular changes made by inputs of the function component.

In a further advantageous method, by means of an ibx, at least one variable is defined at a predetermined value, or the value of that variable is changed.

Advantageously, the permanent storage of the input information is effected by means of a modification of the declaration of instances of the function component. In this method, the parameters or variables to be changed are read in directly upon initialization. This procedure is easy to do, on the one hand; on the other, however, such a change is possible only upon call-up or at the beginning of a process.

As a rule, SPS programs comprise a declaration part and an implementation part. Along with the modification of the declaration of function component instances, the implementation part can also be modified. The portion to be modified can for instance be an independent POU (Program Organization Unit) (i.e. function component, program, function) for initializing the function component instance. Besides an independent initialization POU, a code portion made recognizable by suitable commentary can also be used for initializing the function component instance, which is then modified accordingly.

In another advantageous method, the outcomes of the optimization of the program parameters are stored in a permanent storage medium, where they are read out again at the start of a program or during the initialization of the program. In this procedure, it would be possible for example to set up a database, or for another persistent memory to be provided. This procedure makes changes in the offline mode possible, in particular.

In another advantageous embodiment, at least some of the information exchange sequences are output. This means that these exchange sequences are made visually available to the user so that he can make changes more conveniently. Advantageously, outcomes of the programming operations can also be changed in the offline mode (which is possible especially with the use of a permanent storage medium).

The present invention is furthermore directed to an apparatus for programming and diagnosis of a memory-programmable controller, having at least one memory-programmable function component, in which for programming, a predetermined programming system is used, and in the context of this programming system variables are predetermined, and information exchange sequences are used for the programming, and the apparatus has at least one information output unit which at least partly outputs the information exchange sequence. According to the invention, input information is stored at least in part permanently in memory. The term "permanent storage in memory" is understood in particular to mean that the aforementioned information is not lost in a reset of the system or on rebooting (for instance after a shutoff and reactivation), but is again available.

In an advantageous embodiment, the apparatus has at least one storage medium for permanent storage of information. This may be a database, for example, or a separate storage medium. However, it would also be possible for the information to be predetermined upon initialization in the declaration or in the implementation part (by being taken over into the SPS source code). On this respect again, permanent storage of this information is on hand.

BRIEF DESCRIPTION OF THE DRAWINGS

The invention will be better understood and further objects and advantages thereof will become more apparent from the ensuing detailed description of a preferred embodiment taken in conjunction with the drawings, in which:

FIG. 5 is a further diagram to illustrate a method according to the invention.

DESCRIPTION OF THE PREFERRED EMBODIMENT

Figure 1:
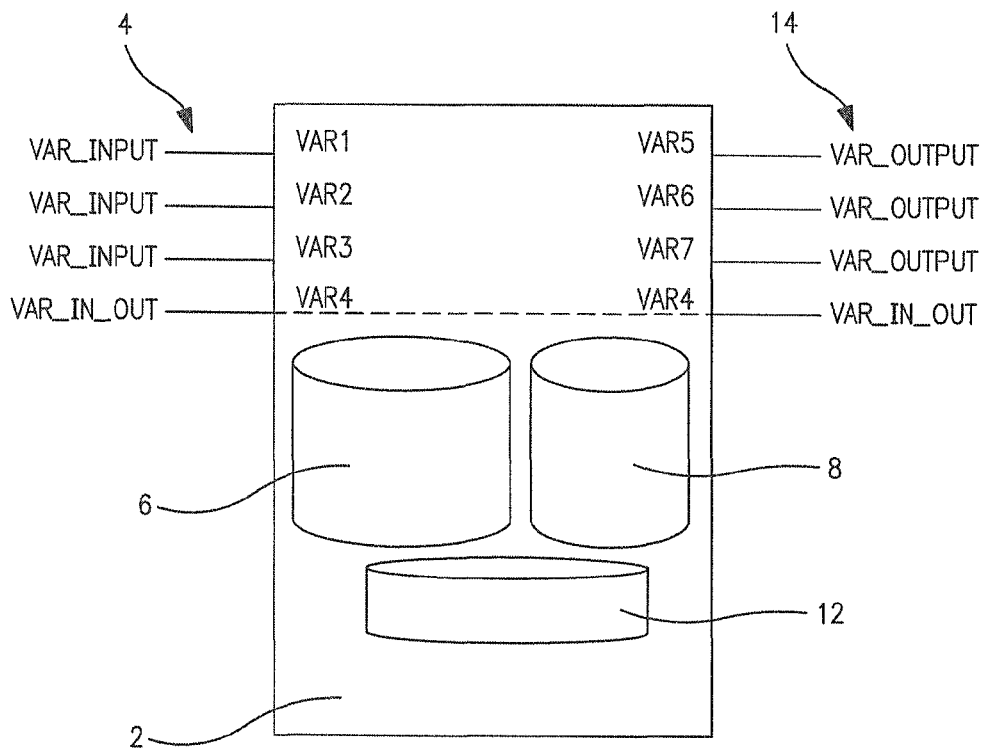
FIG. 1 is a schematic illustration of a method according to the prior art.

FIG. 1 shows an illustration of a function component 2. This function component 2 has inputs 4 and outputs 14. A code 12 is also provided, as well as a memory area 6 for the inputs or their variables (VAR_INPUT, VAR_OUTPUT, VAR_IN_OUT) and a further storage medium 8 for local variables of the function component 2. Reference numeral 12 pertains to a code of the function component 2.

Figure 2:
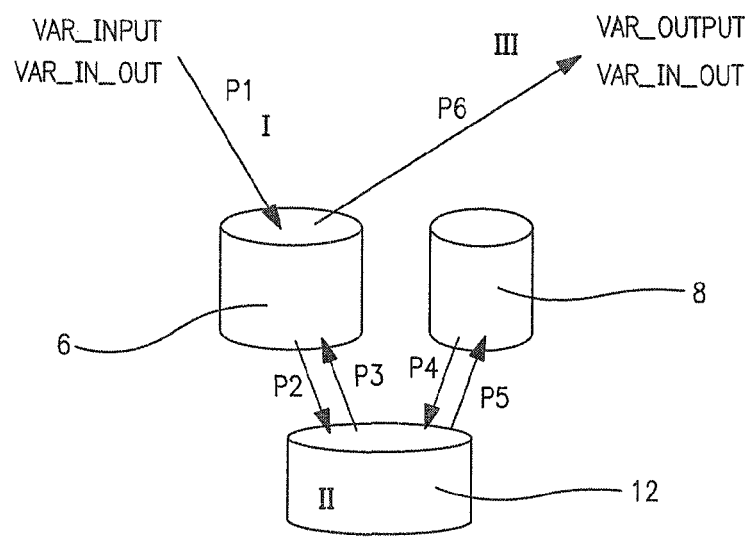
FIG. 2 is a further illustration of the method known from the prior art.

As shown in FIG. 2, when a function component 2 is called up, first the input variables contained in the call-up—in this case for example VAR_INPUT and VAR_IN_OUT (these also include references variables, or in other words pointer variables)—are copied into the internal memory area 6 of the function component 2 (arrow P1, step I). In a further step (step II), the function component code 12 is executed. In a final step (arrow P6, step III), the outputs are refreshed with the data of the internal variables (VAR_OUTPUT and VAR_IN_OUT).

It should be noted that in the first step, only some of all the function component inputs (or more precisely: VAR_INPUTs) can be contained in the function component call-up; that is, only some of the existing internal function component variables are changed.

It is also important that the internal function component variables in the internal function component memory are only volatile data, which in the next reset or when the SPS is switched on are newly preassigned either default values dependent on their data type, or initialization values stored in memory in the declaration, or are described with initial values stored in memory in the SPS program. More precisely, the entire function component can be instantiated in a so-called VAR_RETAIN variable declaration. As a result, all the variables (inputs/outputs, and internal variables) are stored in a retained data memory.

However, a user—once he has made changes by means of function component dialogs—can enter these changes manually in the SPS program. To do so, on the one hand he can use the declaration of the function component instances; on the other, he can for example use a special code portion for initializing variables (and thus also use internal function component inputs/outputs) and/or can changes the variables in the normal course of the program.

Figure 3:
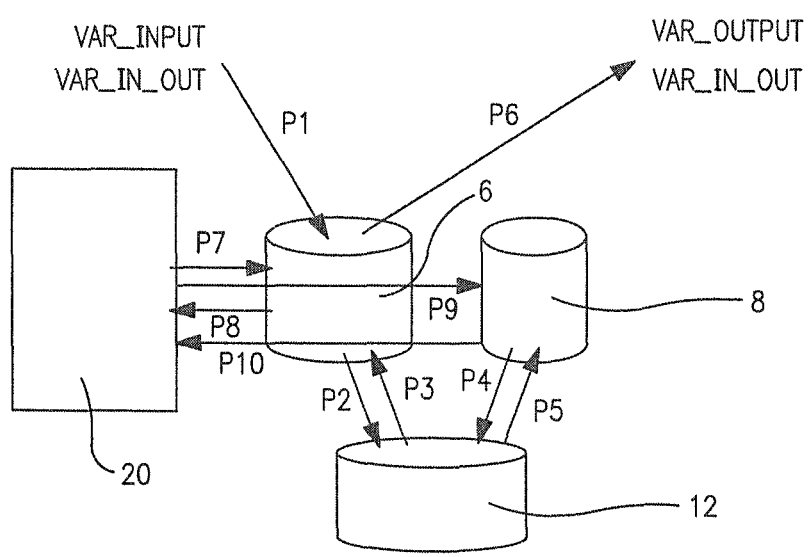
FIG. 3 is a further illustration of the method known from the prior art.

In the method described in DE 10 2007 062 453.2, the information exchange sequences or function component dialogs 20 shown in FIG. 3 are additionally used. With the aid of these information exchange sequences 20 it is possible to change the variables, represented by the arrows P7 and P8, and to read these variables out of the memory 6, as indicated by the arrows P9 and P10. The arrows P2 and P3 indicate the interaction in the read-in operation between the memory area 6 and the function component code, and the arrows P4 and P5 indicate the exchange between the function component code and the memory area 8.

The dialogs described in DE 10 2007 062 453.2 for displaying and changing function component input/output variables permanently change only the function component inputs (VAR_INPUTs), which are not also indicated in the function component call-up because they would otherwise be overwritten again in the next function component call-up; that is, the dialogs can be suitably used only for the function component inputs that in the call-up are not suppressed with a value or a variable, since only in that case are the values established via the dialogs not overwritten.

In the prior art described, none of the changes made by means of function component dialogs are therefore persistent, or as a rule are performed only in the volatile memory of the SPS. If such persistence of the change is necessary, it must be entered manually by an SPS programmer Also, in the procedure illustrated in FIG. 3, the function component dialogs can be used only online (since they must be accessed on memories of the SPS runtime).

In the context of the invention, it is therefore proposed that a status of these changed function component instances can be stored in persistent form in memory. Especially advantageously, the aforementioned function component dialogs 20 can also be used offline. It is thus possible in particular for changed values to be inserted into or changed in an SPS variable declaration automatically, or an initialization program is generated, or by means of a database (for example as a data file), the values to be changed are stored in memory and are read in upon a new start. Each of these provisions thus allows permanent storage of the changes in memory and thus overall makes it possible to simplify the programming.

Figure 4:
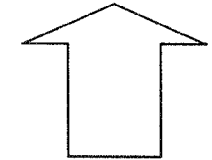
FIG. 4 is a diagram to illustrate a method according to the invention.

FIG. 4 shows a first provision according to the invention for achieving this described persistence. In this case, a modification of the declaration of function component instances is performed.

Each SPS variable, thus also including a function component instance, has a place in the SPS programming tool at which it is declared. This place is unique; that is, every SPS variable can receive initialization data at precisely one single location.

These initialization data are taken over by the logic of the function component dialogs, for instance upon termination of the dialogs, or taken over into the declaration by means of a button in the dialog. After the user logs out of the SPS runtime system, the declaration of the corresponding function component instances are automatically changed by the function component dialog logic. After that, before the user next logs in, the SPS program has to be recompiled into the SPS runtime system.

In the right-hand window 22 as seen in FIG. 4, an initialization of the various data is thus made possible. This initialization is called up when the SPS is started, in the internal memory of the function component. Thus in this embodiment, storage of the data in memory is called up via a suitable initialization of the function components. Thus automation of the aforementioned changes is possible here.

FIG. 5 shows one such automated change according to the invention. The left-hand part 24 shows a declaration before the change. The right-hand part 26 shows the declaration after the change of the automatic code generation. In detail, what has been done here is a change in the initialization value from a "set point" of 0.0 to 15.0. In the prior art, this initialization is inserted independently by an SPS programmer. As shown in FIG. 5, however, here a declaration is changed after a change by the function component dialog logic.

Besides the method described here, however, it is also possible to serialize function component instances; that is, to store a status of objects in a persistent storage medium, such as a data file or an nvRAM. The reverse operation, that is, restoration of the status of an object, is known as deserialization.

Today, especially in the context of writing PC applications programs, serialization and deserialization are familiar methods for furnishing persistent objects. To that end, in new data types, the functionality for serialization and deserialization must be furnished by the programmer himself. Alternatively, recourse can be had to libraries that furnish this functionality.

Until now, in SPS systems, only the operation of deserialization is used within the initialization part of the SPS program, for instance by uploading machine parameters.

In the context of the present invention, it is proposed that the logic for serialization as well as deserialization be furnished automatically. It is also possible for the SPS programmer to be able to use this functionality in his or her SPS program. This serialization is moreover performed not only by the object itself, but also externally for the object by the function component dialogs. It would also be possible to use so-called retained variables; that is, variables that are maintained over (a plurality of) steps in the program.

For example, if in the initialization and/or cyclical part of the SPS program, a retained variable is connected to one input of a function component, or if the function component is always called up with the same retained variables, then instead of the internal function component data, the connected retained variable can also be used for persistent storage in memory.

Retained variables are by definition persistent variables of the SPS programming system.

The difficulty in using retained variables is that after the call-up of the function component, the entire SPS program code has to be searched through, and every connected retained variable must be changed by the function component dialogs. If the same retained variable is connected to different function components, the result is program performance that is hard to comprehend.

In a further method, it is possible to store the persistent data in the controller in addition. It would then be possible to make a data file that serves to store these data in memory available in the controller. Even storage in a globally present and by definition persistent SPS variable would be conceivable, especially with defined names and a defined structure. Finally, storage in a fixed memory area in the SPS could be done, with a defined structure.

The data base then, besides the values to be initialized, also contains at least a reference to the function component instance or to the function component inputs to be changed, which can for instance be an address pointer or the name of the variable itself. In the latter case, an instance must exist that is capable of deriving the appropriate memory cell from the variable names (address resolution using a so-called symbol data file). The address of the instance will presumably not suffice—symbol information will be required for every variable to be secured.

The data in the database/data file are written by the function component dialogs and on the SPS start are evaluated by a routine which then contains the appropriate default functionality.

It would also be possible to use a predefined initialization POU (assigned program units), which performs the initializations of variables. This POU can for instance have a defined name and is parsed by the function component dialogs, or corresponding lines are changed. This variant, however, like the change in the declaration, requires retranslating the SPS program and downloading it into the SPS.

It is moreover also possible for the functions for the serialization and deserialization to be furnished automatically.

Using the function component dialogs, a function (or action) of that POU within which the function component instance to be deserialized is declared can be added automatically. That is, the SPS code is modified by the function component dialogs. Within the automatically added function (or action), a code for restoring (deserializing) the status of the function component instance is stored in memory. This is added by the user to the initialization part of his or her SPS program. Upon a (re-)start of the SPS, in the initialization part the data to be restored are read out of a data file, the nvRAM, a database, or an object that is a component of the SPS runtime system, and the previous status of the function component instance is restored again. The function component dialogs can in turn write the values, changed by the user in the function component dialogs, into the data file, nvRAM, database or SPS object again, so that on the next restart of the SPS, the changed values are on hand in the function component instance.

Fundamentally, the aforementioned data are present in the context of the memory for the function component itself. This means that in principle, they are read out, displayed and changed out in the online mode only if the surface having the function component dialogs is in communication with the SPS. With the aid of the methods described, it is intended to be made possible for the data also to be displayed and changed in the function component dialogs in the offline mode as well.

In this respect, the following situations should be differentiated, namely on the one hand, the aforementioned declaration or initialization POU (or initialization portion), and on the other, a database in the controller or the use of retain variables. In the event of a change in the declaration or of an initialization POU, the corresponding code part of the SPS program is parsed, and the corresponding variable values are displayed in the function component dialogs. Once a change has been made, the corresponding code part is modified, but must, as mentioned above, later be retranslated and downloaded into the SPS.

If a data base in the controller or retain variables is used, a database can be used which is initially located in the computer having the programming surface. The values in that database can then be displayed and changed in the offline mode as well. The next time the user goes online, this database is synchronized with the corresponding databases in the SPS.

In the case of a database in the SPS, the data must be synchronized, for example by overwriting them in a data file present in the SPS, or generating them if the data file is not present. If no database in the SPS is used, then the data are written into the corresponding retain variables.

All the characteristics disclosed in the application documents are claimed as essential to the invention, if they are individually or in combination novel over the prior art.

The foregoing relates to a preferred exemplary embodiment of the invention, it being understood that other variants and embodiments thereof are possible within the spirit and scope of the invention, the latter being defined by the appended claims.

The invention claimed is:

1. A method for programming or diagnosis of a memory-programmable controller having at least one memory-programmable function component that can be programmed by a predetermined programming system to predetermine system variables, the method comprising:

programming the at least one memory-programmable function component with information exchange sequences;

outputting results of the programming during an offline, non-debugging programming mode via an output device; and modifying a declaration of instances of the function component or a program organization unit to input information that is at least in part stored permanently in non-volatile memory of the at least one memory-programmable function component.

2. The method as defined by claim 1, further comprising:
assigning the information exchange sequences to the function component; and
accessing the assigned information exchange sequences as predefined information exchange sequences of the memory-programmable function component.

3. The method as defined by claim 1, further comprising:
executing changes with inputs or outputs of the function component to generate the results of the programming.

4. The method as defined by claim 2, further comprising:
executing changes with inputs or outputs of the function component to generate the results of the programming.

5. The method as defined by claim 1, further comprising:
defining at least one variable at a predetermined value with an information exchange sequence.

6. The method as defined by claim 2, further comprising:
defining at least one variable at a predetermined value with an information exchange sequence.

7. The method as defined by claim 3, further comprising:
defining at least one variable at a predetermined value with an information exchange sequence.

8. The method as defined by claim 4, further comprising:
defining at least one variable at a predetermined value with an information exchange sequence.

9. The method as defined by claim 1, further comprising:
storing the results of the programming in a permanent storage medium.

10. The method as defined by claim 1, further comprising:
outputting at least some of the information exchange sequences.

11. The method as defined by claim 1 further comprising:
outputting at least some of the information exchange sequences.

12. The method as defined by claim 1, further comprising:
changing the results of the programming in the offline, non-debugging programming mode; and
making the changes persistent by the modification of the declaration of instances of the function component or a program organization unit.

13. An apparatus for programming and diagnosis of a memory-programmable controller, comprising:
at least one memory-programmable function component that can be programmed with a predetermined programming system to predetermine system variables;
information exchange sequences that are used for the programming of the at least one memory-programmable function component;
at least one information output unit which outputs at least a portion of the information exchange sequences during an offline, non-debugging programming mode; and
a modified declaration of instances of the function component or a program organization unit to input information that is stored at least in part permanently in non-volatile memory of the at least one memory-programmable function component.

14. The apparatus as defined by claim 13, wherein at least one information exchange sequence defines a variable to a predetermined value.

\* \* \* \* \*